United States Patent [19]

Plate et al.

[11] Patent Number: 4,863,544
[45] Date of Patent: Sep. 5, 1989

[54] RECIPROCATING HEAT SEALING MEANS

[75] Inventors: Gary Plate, Waterdown; Nicolaas V. Hattem, Bradford, both of Canada

[73] Assignee: ATR Equipment Industries Limited, Mississauga, Canada

[21] Appl. No.: 186,343

[22] Filed: Apr. 26, 1988

[51] Int. Cl.$^4$ ............................................. B32B 31/18
[52] U.S. Cl. ..................... 156/251; 156/515; 156/530
[58] Field of Search ............... 156/251, 73.5, 73.6, 156/518, 530, 515; 53/449, 451, 477, 76, 373; 493/203, 209

[56] References Cited

U.S. PATENT DOCUMENTS

| | | | |
|---|---|---|---|
| 2,154,521 | 4/1939 | Maxfield | 53/477 |
| 2,947,345 | 8/1960 | Schjeldahl | 156/544 |
| 3,706,177 | 12/1972 | Willett | 53/373 |
| 4,455,134 | 6/1984 | Biggs | 425/517 |
| 4,529,472 | 7/1985 | Hsu | 156/515 |

Primary Examiner—Caleb Weston
Attorney, Agent, or Firm—Eugene J. A. Gierczak

[57] ABSTRACT

Apparatus for thermally welding two layers together including; a first and second bar, wherein one of the bars presents a larger welding surface than the other bar; structure for reciprocally moving at least one of the bars relative to the other bar, in a first direction between an open position wherein the bars are disposed in spaced apart relationship so as to permit the insertion and withdrawal of said layers between the bars, and a closed position wherein at least one of said bars is adapted to apply heat and pressure to said layers for welding said layers together; and structure which reciprocally moves at least one of said bars relative the other bar in a second direction between two limit positions so as to present different portions of said bar having the larger welding surface for each successive weld of said layers to evenly utilize the entire welding surface of the larger welding surface over successive welds.

14 Claims, 1 Drawing Sheet

RECIPROCATING HEAT SEALING MEANS

FIELD OF INVENTION

This invention relates to a method and apparatus for effecting a thermal union between layers of material, and particularly relates to a method and apparatus for thermally bonding layers of heat sealable plastic film by utilizing reciprocating heat sealing bars.

BACKGROUND OF THE INVENTION

Various methods and apparatus have heretofore been used for joining layers of heat sealable plastic or thermal plastic layers, which generally utilize a heated sealing bar or electrode which is brought into engagement with the plastic layer. The heated sealable bar melts the plastic and the pressure of the bar against the plastic forms a thermal weld.

For example, U.S. Pat. No. 2,947,345 discloses a single straight hot knife blade that overlies a cutting and sealing roll normally in spaced relation and is adapted to be depressed there against when the thermal plastic webs have advanced to their proper positions on the cutting and sealing roll so as to seal and cut said thermal plastic webs.

Furthermore, U.S. Pat. No. 3,706,177 teaches a sealing unit mounted on a framework which permits up and down movement thereof so as to accommodate bags of slightly varying heights.

Moreover, U.S. Pat. No. 4,455,134 illustrates a hand operated thermal press for installing metal inserts in a workpiece of thermal plastic material.

Finally, U.S. Pat. No. 2,154,521 discloses the clamping of heat forming tools for sealing filled containers.

Each of such prior art heat sealing structures including those referred to above generally utilize a bar, electrode or roller which is adapted to be pressed against another bar, electrode or roller so as to seal thermal plastic materials therebetween.

Over a prolonged period of usage, such heat sealable bars, electrodes or rollers become worn and exhibit localized wear spots in those areas of repeated application of heat and pressure which results in less efficient thermal bonding of plastic film.

Furthermore, in those arrangements where a heat sealable bar configured in the shape of a knife is repeatedly reciprocally pressed against another bar, such knife edge relatively quickly imparts a "wear groove" localized within the area of contact with the other bar.

Moreover in those arrangements where a heat sealable bar contacts a roller such rollers become unevenly worn and tend to lose their roundness and thereafter experience erratic rotational patterns.

It is an object of this invention to provide for a more efficient heat sealable bar.

It is a further object of this invention to provide heat sealable bars which substantially eliminate localized wear characteristics over prolonged usage.

FEATURES OF THE INVENTION

The broadest aspect of this invention relates to apparatus for thermally welding two layers together which includes; first and second bars, wherein one of said bars presents a larger welding surface than the other bar; structure for reciprocally moving at least one of said bars relative said other bar in a first direction between an open position wherein said bars are disposed in spaced apart relationship so as to permit the insertion and withdrawal of said layers between said bars and a closed position wherein one of said bars is adapted to apply heat and pressure to said layer for welding said layers together; and wherein said reciprocally moving structure moves at least one of said bars relative said other bar in a second direction between two limit positions so as presents different portions of said bar means having said larger welding surface for each successive weld of said layer and to evenly utilize the entire welding surface of said larger welding surface over successive welds.

It is another aspect of this invention to provide apparatus for thermally welding thermal plastic layers including first and second bars, wherein said second bar presents a larger welding surface than said first bar; structure for reciprocally moving said first bar relative said second bar in a vertical direction between an open position wherein said bars are disposed in spaced apart relationship so as to permit the insertion and withdrawal of said thermal plastic layers between said bars, and a closed position wherein one of said bars is adapted to apply heat and pressure to said thermal plastic layers to weld said layers together; structure for reciprocally moving said second bar relative said first bar in a horizontal direction between first and second horizontal limit positions so as to present a different portion of said surface of said second bar for each successive weld of thermal plastic layers and evenly utilize the entire welding surface of said second bar over successive welds.

It is yet another aspect of this invention to provide a machine for thermally welding two overlying thermal plastic webs, including first and second sealing bars adapted to move from an open position when said bars are disposed in vertical spaced apart relation to a closed position for welding said second sealing bar presenting a larger welding surface than said first bar, structure for horizontally advancing said overlying thermal plastic webs in a forward direction between said first and second sealing bars when said bars are in said spaced apart open position; structure adapted to temporarily stop both said thermal plastic webs in their forward direction of travel so as to permit welding of said thermal plastic webs; structure for reciprocally vertically moving said first and second sealing bars from said open position to said closed position when said thermal plastic webs are in said temporarily stopped position so as to apply heat and pressure to said thermal plastic webs and weld said thermal plastic webs together along the region of contact between said sealing bars, and for moving said bars from said closed position to said vertically spaced position upon completion of said weld; structure for reciprocally horizontally moving said second sealing bar relative said first sealing bar between two limit position upon completion of said weld, so as to present a different portion of said welding surface of said second bar when welding said thermal plastic webs at said next interval.

10. It is a further aspect of this invention to provide a plastic bag making machine for making plastic bags from overlying thermal plastic webs including first and second sealing bars adapted to move from an open position when said bars are disposed in vertical spaced apart relation, to a closed position for welding, said second sealing bar presenting a larger welding surface than said first sealing bar; structure for horizontally advancing said overlying thermal plastic webs in a forward direction between said first and second sealing bars when said bars are in said spaced apart open position; structure adapted to repeatedly temporarily stop said thermal plastic webs in their forward direction of travel so as to permit welding of said thermal plastic webs; structure for reciprocally vertically moving said first and second sealing bars from said open position to said closed position when said thermal plastic webs are in said temporarily stopped position so as to apply heat and pressure to said thermal plastic webs and weld said thermal plastic webs together along the region of contact between said sealing bars, and for moving said bars from said closed position to said vertically spaced position upon completion of said weld; structure for reciprocally horizontally moving said second sealing bar relative said first sealing bar between two horizontal limit position upon completion of said weld so as to present a different portion of said welding surface of said second sealing bar when welding said thermal plastic webs at said next interval; structure for cutting bags from said welded thermal plastic webs.

It is another aspect of this invention to provide a method for thermally welding thermal plastic webs together including the steps of horizontally inserting said thermal plastic webs between spaced first and second sealing bars adapted to move from an open position when said bars are disposed in vertical spaced apart relation, to a closed position for welding, said second sealing bar presenting a larger welding surface than said first sealing bar; structure for horizontally advancing said overlying thermal plastic webs in a forward direction between said first and second sealing bars when said bars are in said spaced apart open position; structure adapted to repeatedly temporarily stop said thermal plastic webs in a their forward direction of travel so as to permit welding of said thermal plastic webs; structure for reciprocally vertically moving said first and second sealing bars from said open position to said closed position when said thermal plastic webs are in said temporarily stopped position so as to apply heat and pressure to said thermal plastic webs and weld said thermal plastic webs together along the region of contact between said sealing bars, and for moving said bars from said closed position to said vertically spaced position upon completion of said weld; structure for reciprocally horizontally moving said second sealing bar relative said first sealing bar between two horizontal limit position upon completion of said weld so as to present a different portion of said welding surface of said second sealing bar when welding said thermal plastic webs at said next interval; cutting bags from said welded thermal plastic webs.

DRAWINGS

These and other fixtures and objects are illustrated and described in the following specifications to be read in conjunction with the sheets of drawings in which.

DETAILED DESCRIPTION OF THE INVENTION

Identical parts have been given identical numbers throughout the figures.

Figure 1:
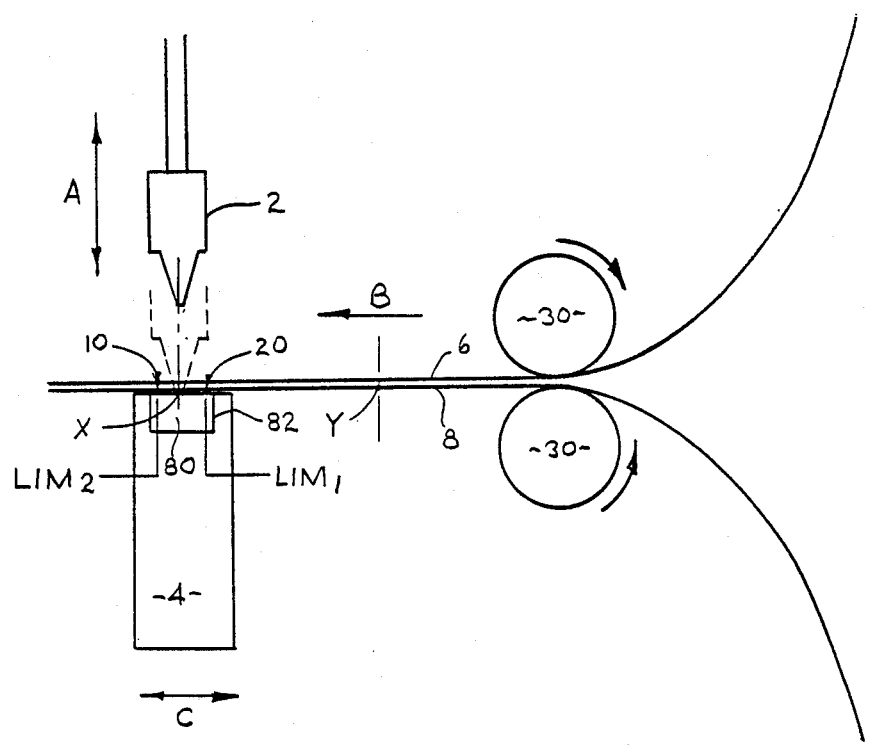
FIG. 1 is a cross section view in side elevation of the apparatus described in this invention.

FIG. 1 illustrates an apparatus for thermal welding two layers 6 and 8 together.

More particularly, the apparatus disclosed in FIG. 1 shows a first sealing bar 2 which overlies a second sealing bar 4 in vertical spaced apart relationship. The sealing bar 2 disclosed in FIG. 1 shows a sealing and cutting bar 2 whereby the layers 6 and 8 are both sealed and cut in one operation since the bar 2 presents a tip which may present a 1/64 or 1/32 inch tip. In such arrangement bar 2 would cut and seal the trailing edge of one sealed layers and the preceeding edge of the next sealed layers.

Figure 2:
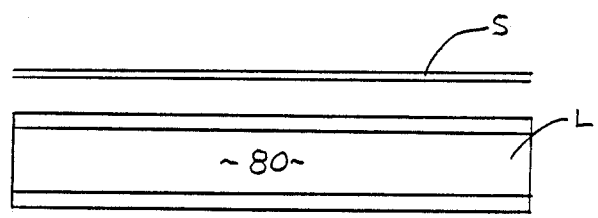
FIG. 2 is a plan view of the welding surface of the sealing bars.

The electrodes 2 and 4 are adapted to be displaced or moved in a first direction illustrated by arrows A which in the arrangement illustrated in FIG. 2 corresponds to a vertical direction.

More particularly, the electrodes 2 and 4 are adapted to be reciprocally vertically moved from an open position wherein the sealing bars 2 and 4 are vertically spaced apart so as to permit the insertion and withdrawal of the layers 6 and 8 between the sealing bar 2 and 4. More particularly, the layers 6 and 8 comprise of thermal plastic layers of film which are capable of being thermally plastically welded.

The thermal plastic layers of film 6 and 8 may be manually inserted between the sealing bars 2 and 4 as discreet pieces of thermal plastic layers or as illustrated in FIG. 1 may comprise of a length of thermal plastic web which is continuously unravelled from a roll (not shown).

The sealing bars 2 and 4 are adapted to reciprocally move between an open position illustrated in FIG. 1 for the insertion of the thermal plastic webs therebetween and a closed position wherein at least one of the sealing bars 2 and 4 is adapted to apply heat and pressure to the thermal plastic webs for welding said webs together between the region of contact between the bars 6 and 8. In the arrangement shown in FIG. 1 bar 2 includes heating means such on an electrode for heating bar 2 in a manner well known to those persons skilled in the art. The bar 2 is comprised of a heat conducting material such as metal. The bar 4 may also include heating means such as an electrode.

Upon completion of the weld sealing bars 2 and 4 vertically move to the open position so as to allow the thermal plastic webs to advance in a forward horizontal direction illustrated by arrow B so as to present a new portion of the thermal plastic web to be welded.

FIG. 2 best illustrates the relationship of the welding surface of sealing bar 2 and sealing bar 4. More particularly, sealing bar 2 is configured so as to present a smaller area S of welding surface as compared to the welding area L of sealing bar 4. In other words, when sealing bar 2 is in the closed position with respect to sealing bar 4 when welding said thermal plastic webs 6 and 8 the region represented by numeral 10 of the sealing bar 4 will experience the applied heat and pressure. When the sealing bar 2 is vertically moved from the closed position to the open position the sealing electrode 4 is adapted to be reciprocally moved in a second horizontal direction illustrated by arrow C between two horizontal limit positions namely, $LIM_1$ and $LIM_2$. In other words, when sealing bars 2 and 4 have welded the thermal plastic webs 6 and 8 and are then moved into the open position sealing electrode 4 is horizontally moved in the direction of arrow C so as to present a different section of welding surface L. Therefore, during the next welding cycle the weld surface S of sealing bar 2 will contact the region represented by numeral 20 of the welding surface L of sealing bar 4. Therefore as the sealing electrodes 2 and 4 reciprocally vertically move between the open and closed position the sealing bar 4 horizontally reciprocally moves between the horizontal position $LIM_1$ and $LIM_2$ so as to present different portions of sealing bar 4 so as to evenly utilize the entire welding surface of the sealing bar 4 over successive welds.

Furthermore, sealing bar 4 may be adapted to incrementally move in the horizontal direction between $LIM_1$ and $LIM_2$ in incremental stages as sealing bar 4 reciprocates between the two horizontal limit positions $LIM_1$ and $LIM_2$. When the sealing bar 4 moves to the portion $LIM_2$ (i.e. the tip of bar 2 hits $LIM_2$) the bar 4 is incrementally indexed so that the bar 4 will fully move to the $LIM_1$ portion (i.e. the next weld will take place at $LIM_1$) so as to break any sticking of the weld to the bar 2. In other words the bar 4 incrementally moves from $LIM_1$ to $LIM_2$ and then from $LIM_2$ reciprocally moves in one step to the maximum reach $LIM_1$ so as to prevent any jam up's which may arise due to "sticking" of a sealed edge to the bars 2 and 4. Such action may be accomplished by a cam which incrementally rotates in a circle and adapted to advance to the original portion upon each 368° turn, or limit switches may be used in a manner known to those persons skilled in the art.

FIG. 1 also illustrates that sealing bar 4 may include an insert 80 which is adapted to be retained on a recess 82 adapted to receive the insert 80. The insert 80 may be comprised of a heat resistant rubber such as silicon rubber. The insert 80 would be releaseable secured in recess 82 by means of suitable fasteners (not shown) such as screws or the like and could be replaced with a new insert 80 after prolonged usage. The insert 80 would include the larger welding surface L.

The apparatus disclosed in FIG. 1 may be adapted in a machine for thermally welding two overlying thermal plastic webs 6 and 8, and in a particular application may be adapted to be utilized in a plastic bag machine for making plastic bags from overlying thermal plastic webs 6 and 8.

Such machine would include a first and second sealing bar 2 and 4 which are adapted to move from an open position as illustrated in FIG. 1 when the sealing bars 2 and 4 are disposed in spaced apart relationship to a closed position for welding.

Such machine would also include means such as pinch rollers 30 which are adapted to horizontally advance the overlying thermal plastic webs 6 and 8 in a forward direction B between the first and second sealing bars 2 and 4 when the sealing bars 2 and 4 are in said open spaced apart position.

Furthermore, such machine may be adapted to temporarily stop the thermal plastic webs 6 and 8 in their forward direction B as for example by temporarily stopping the rotation of pinch rollers 30 so as to permit welding of the thermal plastic webs 6 and 8.

Thereafter the machine would include structure (not shown) for reciprocally vertically moving the first and second sealing bars 2 and 4 from the open position to closed position when the thermal plastic webs 6 and 8 are in the temporary stopped position so as to apply heat and pressure to the thermal plastic webs and weld said thermal plastic webs together along the region of contact between the sealing bars, and for moving the sealing bars from the closed position to said vertically spaced position upon completion of the weld.

The machine also includes structure (not shown) for horizontally moving the sealing bar 4 relative the first sealing bar 2 between two limit position namely $LIM_1$ and $LIM_2$ upon completion of the weld so as to present a different portion of the welding surface of the second sealing bar 4 when welding the thermal plastic webs 6 and 8 at the next interval.

Furthermore, the machine may be adapted to include a cutting station (not shown) whereby bags may be cut from the welding thermal plastic webs 6 and 8.

The heat sealable bars 2 and 4 illustrated in FIG. 1 and 2 have been described as performing a sealing function only although such sealing bars may also be adapted to cut the thermal plastic webs 6 and 8 to produce a bag (not shown).

Finally, the sealing bars 2 and 4 may be adapted to impart side welds on to the thermal plastic layers 6 and 8 as illustrated by letters X and Y so as to, for example, impart the side welds on a plastic bag. Furthermore, the sealing electrodes 2 and 4 may be adapted to impart bottom welds as, for example, imparting the bottom weld of a plastic bag which in the illustration referred to in FIG. 1 would comprise of a welded seal between the letters X and Y.

Although the preferred embodiment as well as the operation and use have been specifically described in relation to the drawings, it should be understood that variations in the preferred embodiment could easily be achieved by a man skilled in the art without departing from the spirit of the invention. Accordingly, invention should not be understood to be limited to the exact form revealed by the drawings.

The embodiments of the invention in which an exclusive property or privilege is claimed are defined as follows:

1. Apparatus for thermally welding two layers together including:
    (a) first and second bar means, wherein one of such bar means presents a larger welding surface than said other bar means,
    (b) means for reciprocally moving at least one of said bar means relative said other bar means:
        (i) in a first direction between an open position wherein said bar means are disposed in spaced apart relationship so as to permit the insertion and withdrawal of said layers between said bar means, and a closed position wherein one of said bar means is adapted to apply heat and pressure to said layers for welding said layers together,
        (ii) in a second direction between two limit positions so as to present different portions of said bar means having said larger welding surface for each successive weld of said layers and evenly utilize the entire welding surface of said larger welding surface over successive welds.

2. Apparatus as claimed in claim 1 wherein said reciprocally moving means in a second direction moves one of said bar means relative said other bar means in a second direction in increments between said two limit positions.

3. Apparatus for thermally welding thermal plastic layers including:
    (a) first and second bar means wherein said second bar means presents a larger welding surface than said first bar means,
    (b) first means of reciprocally moving said first bar means relative said second bar means in a vertical direction between an open position wherein said bar means are disposed in spaced apart relationship so as to permit the insertion and withdrawal of said thermal plastic layers between said bar means, and a closed position wherein one of said bar means is adapted to apply heat and pressure to said thermal plastic layer to weld said layers together, (c) second means for reciprocally moving said second bar means relative said first bar means in a horizontal direction between first and second horizontal limit positions, so as to present different portions of said surface of said second bar means for each successive weld of thermal plastic layers and evenly utilize the entire welding surface of said second bar means over successive welds.

4. Apparatus as claimed in claim 3 wherein said second bar means includes a replaceable welding insert which comprises said large welding surface, said insert adapted to be replaced after prolonged use.

5. Apparatus as claimed in claim 4 wherein said second reciprocally moving means moves said second bar means relative to said first bar means between said first and second horizontal limit position in increments.

6. In a machine for thermally welding two overlying thermal plastic webs along spaced intervals, including:
(a) first and second sealing bar means adapted to move from an open position when said bar means are disposed in spaced apart relationship to a closed position for welding, said second bar means presenting a larger welding surface than said first bar means,
(b) means for horizontally advancing said overlying thermal plastic webs in a forward direction between said spaced first and second sealing bar means when said sealing bar means are in spaced apart open position,
(c) means adapted to repeatedly temporarily stop both said thermal plastic webs in their forward direction of travel so as to permit welding of said thermal plastic webs,
(d) first means for reciprocally vertically moving said first and second sealing bar means from said open position to said closed position when said webs are in said temporarily stopped position, so as to apply heat and pressure to said thermal plastic webs and weld said thermal plastic webs together along the region of contact between said sealing bar means, and for moving said sealing bar means from said closed position to said vertically spaced position upon completion of said weld,
(e) second means for horizontally moving said sealing bar means relative said first sealing bar means between two horizontal limit positions upon completion of said weld so as to present a different portion of said welding surface of said second bar means when welding said thermal plastic webs at said next interval.

7. In a machine as claimed in claim 6 wherein said second sealing bar means includes a replaceable welding insert which comprises said larger welding surface, said insert adapted to be replaced after prolonged usage.

8. In a plastic bag making machine for making plastic bags from overlying thermal plastic webs including:
(a) first and second sealing bar means adapted to move from an open position when said bar means are disposed in spaced apart relationship to a closed position for welding, said second sealing bar means presenting a larger welding surface than said first sealing bar means,
(b) means for horizontally advancing said overlying thermal plastic webs in a forward direction between said spaced first and second sealing bar means when said bar means are in said open position,
(c) means adapted to repeatedly temporarily stop both said thermal plastic webs in their forward direction of travel so as to permit welding of said thermal plastic webs.
(d) first means for reciprocally vertically moving said first and second sealing bar means from said open position to said closed position when said webs are in said temporary stop position so as to apply heat and pressure to said thermal plastic webs and weld said thermal plastic webs together along the region of contact between said sealing bar means, and for moving said sealing bar means from said closed position to said vertically spaced position upon completion of said weld,
(e) second means for horizontally moving said second sealing bar means relative said first sealing bar means between two horizontal limit positions upon completion of said weld so as to present a different portion of said welding surface of said second sealing bar means when welding said thermal plastic webs at said next interval,
(f) means for cutting a bag from said welded thermal plastic webs.

9. A method of thermally welding thermal plastic layers together including the steps of:
(a) horizontally inserting said thermal plastic layers between spaced first and second bar means wherein said second bar means presents a larger welding surface than said first bar means;
(b) reciprocally moving said first bar means relative said second bar means in a vertical direction from said open position to a closed position wherein said bar means are adapted to apply heat and pressure to said thermal plastic layers to weld said layers together, and then reciprocally moving said first bar means relative said second bar means to said open position so as to withdraw said welded thermal plastic layers;
(c) reciprocally moving said second bar means relative said first bar means in a horizontal direction between a first and second horizontal limit position so as to present different portions of said surface of said second bar means for each successive weld of said thermal plastic layers, and evenly utilize the entire welding surface of said second bar means over successive welds.

10. In a machine as claimed in claim 7 wherein said second means for horizontally moving said second sealing bar means moves said second sealing bar means relative said first sealing bar means in increments between said two horizontal limit positions.

11. Apparatus as defined in claim 2 wherein said two limit positions are defined by a first limit position and a second limit position and said reciprocally moving means moves one of said bar means from said second limit position to said first limit position after one of said bar means is incrementally moved relative said other bar means from said first limit position to said second limit position.

12. Apparatus as claimed in claim 3 wherein said second reciprocally moving means moves said second bar means from said second horizontal limit position to said first horizontal limit position after said second bar means is incrementally moved relative said first bar means from said first horizontal limit position to said second horizontal limit position.

13. Apparatus as claimed in claim 1 wherein said first and second bar means cut and seal said two layers together.

14. Apparatus as claimed in claim 3 wherein said first and second bar means cut and seal said thermal plastic layers together.

* * * * *